(12) United States Patent
Garrity et al.

(10) Patent No.: US 11,621,485 B2
(45) Date of Patent: Apr. 4, 2023

(54) METAL SPACE FRAME RADOME

(71) Applicant: CPI ESSCO inc., Ayer, MA (US)

(72) Inventors: Bryan Garrity, Malborough, MA (US);
Mark V. Wasson, Billerica, MA (US);
Thomas Feldmar, Clinton, MA (US);
Anatol Kwartler, Maynard, MA (US)

(73) Assignee: CPI ESSCO Inc., Ayer, MA (US)

( * ) Notice: Subject to any disclaimer, the term of this patent is extended or adjusted under 35 U.S.C. 154(b) by 0 days.

(21) Appl. No.: 16/376,211

(22) Filed: Apr. 5, 2019

(65) Prior Publication Data

US 2020/0321695 A1 Oct. 8, 2020

(51) Int. Cl.
*H01Q 1/42* (2006.01)
*F16B 5/00* (2006.01)
*F16B 5/02* (2006.01)

(52) U.S. Cl.
CPC .......... *H01Q 1/425* (2013.01); *F16B 5/0084* (2013.01); *F16B 5/02* (2013.01); *H01Q 1/42* (2013.01)

(58) Field of Classification Search
CPC . H01Q 1/425; H01Q 1/40; H01Q 1/42; F16B 5/0084; F16B 5/02
USPC ......................................................... 343/872
See application file for complete search history.

(56) References Cited

U.S. PATENT DOCUMENTS

| | | | | |
|---|---|---|---|---|
| 3,323,820 | A * | 6/1967 | Braccini | E04B 7/105 403/218 |
| 4,194,851 | A * | 3/1980 | Littlefield | E04B 1/3211 403/218 |
| 4,474,490 | A * | 10/1984 | Harper, Jr. | E04B 1/1903 403/172 |
| 2003/0146346 | A1* | 8/2003 | Chapman, Jr. | B29C 65/56 244/123.3 |
| 2016/0010322 | A1* | 1/2016 | Yonkers | E04B 1/3211 52/81.3 |

* cited by examiner

*Primary Examiner* — Hai V Tran
(74) *Attorney, Agent, or Firm* — Irell and Manella LLP

(57) ABSTRACT

A radome with constructed panels that are mechanically fastened to each other to form a truncated faceted spherical structure. Each panel is constructed of a metal frame and a membrane attached to the frame. The mechanically fastened frame beams panel-to-panel contact spaces are sealed to prevent water ingress.

6 Claims, 5 Drawing Sheets

METAL SPACE FRAME RADOME

RELATED APPLICATIONS

This application claims priority to provisional application Ser. No. 62/653,473 filed Apr. 5, 2018.

FIELD OF THE INVENTION

A radome constructed of panels that are mechanically fastened to each other to form a truncated, faceted spherical structure.

SUMMARY OF THE INVENTION

A radome constructed of panels that are mechanically fastened to each other to form a truncated, faceted spherical structure. Each panel is constructed of a metal frame and a membrane that is attached to the frame. The mechanically fastened frame beams panel-to-panel contact spaces are sealed to prevent water ingress. The apexes of mechanically fastened frames are sealed to prevent water ingress.

A membrane is an attachment to, and thus retained by, the metal frame by sandwiching the membrane between two serrated (toothed) frame beams while imparting a compressive load in the beams using a mechanical fastener, causing the teeth to clamp down on the membrane. It is an object of the present invention for each tooth profile to be configured with surfaces that are parallel to the beam principal longitudinal axis and surfaces that are diagonal relative to the beam principal longitudinal axis.

It is an object of the present invention when the individual beams are mated to create an assembled frame beam with a captured membrane between the individual beams, the dimensional selection allows for a small clearance between teeth surfaces that are parallel to the beams principal longitudinal axis.

It is an object of the present invention for the geometric configuration to enable the compressive force that is imparted to the individual beams when mechanically fastened to each other to convert into a membrane pinching force at the tooth diagonal surfaces intersection lines only, thus maximizing the resistance of the membrane to a pull-out force without the teeth corners piercing (damaging) the membrane.

It is an object of the present invention for each half of the panel frame beam that sandwiches the membrane to be identical and inverse of the other. This allows for all the metal frame beams to be extruded using an identical extrusion die.

It is an object of the present invention for the individual beams to either be bolted or riveted when assembled into an assembled frame beam with a captured membrane between the individual beams.

The present invention further relates to a shank-with-flange (modified T) cross-section shaped gasket that imparts two sealing devices in series to prevent water ingress into the radome across beam contacts. One sealing is accomplished by the gasket shank, the other by the gasket flange.

It is an object of the present invention for the gasket shank (stern) to fit into a membrane lined cavity, created when panel frame beams of adjacent panels are fastened mechanically to one another during radome erecting. It is an object of the present invention for the cavity shape and cross-section size, and the gasket cross-section shape and size to be unique and optimized to attain a desired compression in the gasket shank under any cumulative tolerances condition. The contact between the compressed shank and membrane lined cavity creates one sealing device.

It is an object of the present invention for the gasket flange to angle towards the shank. It is an object of the present invention for the magnitude of the angle and flange size to be a function of a radome diameter and number of panels (which establish the angle between adjacent panels). When the gasket is installed, the gasket flange remains outside the cavity and presses against adjacent panels membranes due to its free state angling towards the shank, thus creating the second sealing device.

It is an object of the present invention for the cavity and gasket shank cross-section shapes to enable retaining of the gasket shank thus preventing the gasket from escaping (squeezing out of) the cavity when compressed.

The present invention relates to the intersection of multiple triangular panels culminating in an apex where the clustered corners of multiple panel frames are joined by mechanical devices.

To prevent water ingress into the radome at cluster joints, a cluster gasket is used to seal each radome apex, (seal the cluster assembly). The cluster assembly gasket is sandwiched between frame membranes and the metal cluster cap cover.

It is an object of the present invention for the radome diameter and number of panels to establish the relative angle between adjacent panels, thus establishing the radome contour.

The cluster gasket must remain compressed against adjacent apex membranes regardless of the radome contour to create a water tight seal.

It is an object of the present invention to maintain compressive contact between cluster sealing gaskets and adjacent radome membranes at each apex under varying radome contours which is accomplished by shaping the cluster gasket longitudinal axis cross-section as a cylinder featuring a constant outside diameter and stepped inner diameter (a stepped cone). When installed, the gasket inner stepped cone smallest step diameter faces the radome interior.

It is an object of the present invention for the contact area and the pressure of the gasket on the apex panels to be optimized for varying radome contours by selecting the number gasket inner diameter steps, the landing length and the height of each inner diameter step, the size of the constant outer diameter, and gasket material.

It is an object of the present invention for the gasket to be fabricated as a bonded assembly of several layers of varying inner diameter and identical outer diameter straight wall cylinders or molded into the final shape.

The present invention relates to adjacent beams of each triangular radome panel to be attached to each other at corners by an assembled corner hinge-like structure. It is an object of the present invention for the hinge-like structure to be formed when. its two identical structure flanges are joined by a shoulder bolt passing through the cavity of the pivot axis.

Each panel corner beam is attached to one flange of the hinge-like structure.

It is an object of the present invention for the angle between the hinge-like structure flanges to be adjusted to the angle formed by beams of different size triangular radome panels. It is an object of the present invention for the angular adjustment to be accomplished by pivoting each of the hinge-like structure flange relative to the other about the shoulder bolt joining the members.

It is an object of the present invention for the angle between the hinge-like structure flanges to be controlled by a gusset spacer that is pressed and pinned-in-place to accurately angle the hinge-like structure flanges relative to each other. The gusset dimensions that impart the relative angle between flanges are proportional the radome panel size.

It is an object of the present invention for the tabs on each hinge-like structure flange to align and control the exact position of the gusset when it is installed.

It is an object of the present invention for the two adjustable members (that is the upper and lower hinges) of the hinge-like structure to be of an identical profile so both can be extruded as a long profile and subsequently cut into identical parts.

It is an object of the present invention for the hinge-like structure pivot shoulder bolt to act as a pivot (hinge) stem and also serve to attach one radome panel to the cluster caps.

The present invention further relates to cut edges and holes of every panel membrane that are sealed from water contact. It is an object of the present invention for this is be accomplished by encapsulating cut edges and adjacent holes within a sealing-film-channel around the membrane periphery to be fused to the membrane film-coating on both sides of the membrane.

It is an object of the present invention for the cut edges of membranes to be sealed using a film that is wrapped over the membranes edge to form a channel, It is an object of the present invention for the sealing-film-channel and the membrane film-coating to be fused when subjected to an optimal temperature, pressure and time cycle.

It is an object of the present invention for all fastener through-boles cut into membranes to be larger than the diameter that is necessary to allow each mechanical fastener to pass through the film-coated panel membrane. The through-hole diameter oversize amount is dependent on the mechanical fastener diameter and the temperature, pressure and time fusing cycle.

It is an object of the present invention for that during the process of fusing the sealing-film-channel to the membrane film-coating using an optimal temperature, pressure and time cycle, the sealing-film-channel sides fuse to each other over each through-hole, forming a single film that bridges each oversized through-hole.

It is an object of the present invention when piercing the single sealing-film that bridges over through-holes to the smaller diameter of the mechanical fastener passing through it, for the edge of each hole to remain sealed.

DETAILED DESCRIPTION

Figure 1:
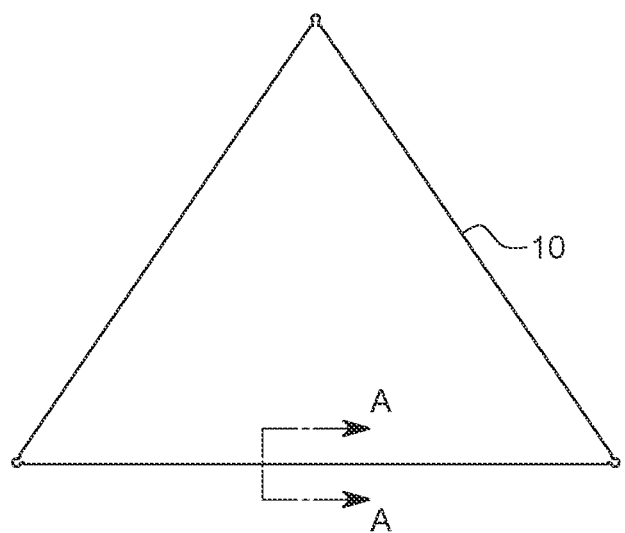
FIG. 1 shows a panel of a radome.

FIG. 1 shows a panel 10 of a radome.

Figure 2:
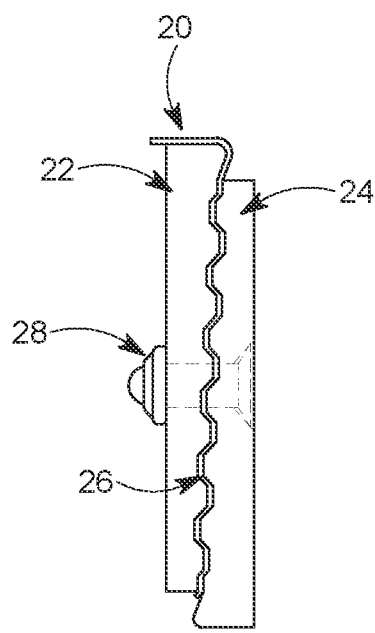
FIG. 2 is a cross section of A-A of FIG. 1.

FIG. 2 shows section A-A of panel 10 which comprises a membrane 20, panel outside beam 22, panel inside beam 24, pinch point 26 and attachment hardware, 28 which in one embodiment is a rivet.

Figure 3:
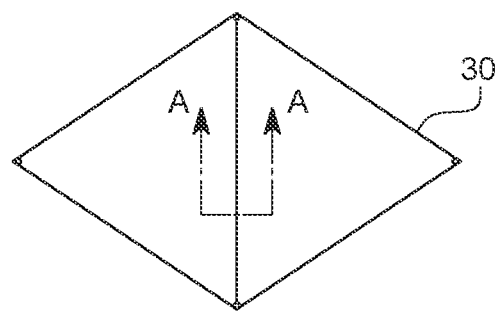
FIG. 3 shows a panel to panel sealing.

FIG. 3 shows 2 panels sealed together 30.

Figure 4:
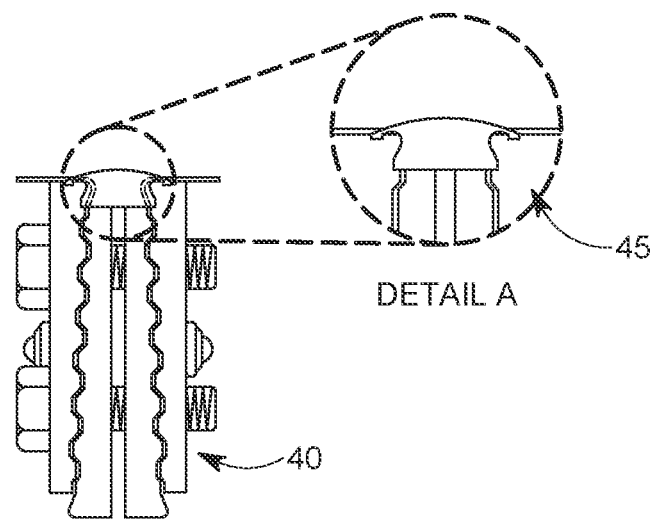
FIG. 4 shows a cross section through A-A in a gasket through uncompressed state.

FIG. 4 shows the cross section A-A of the panels sealed together 30, with the gasket 40 in the uncompressed state. The detail of the uncompressed state is shown in A of 45.

Figure 5:
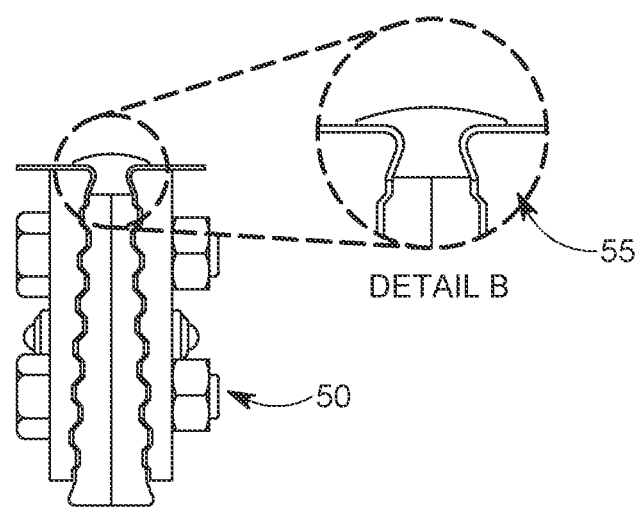
FIG. 5 is a cross section through A-A of a gasket in the compressed state.

FIG. 5 shows the cross section A-A of the panels sealed together 30 with the gasket 50 in the compressed state. The detail of the compressed stated is shown in B of 55.

Figure 6:
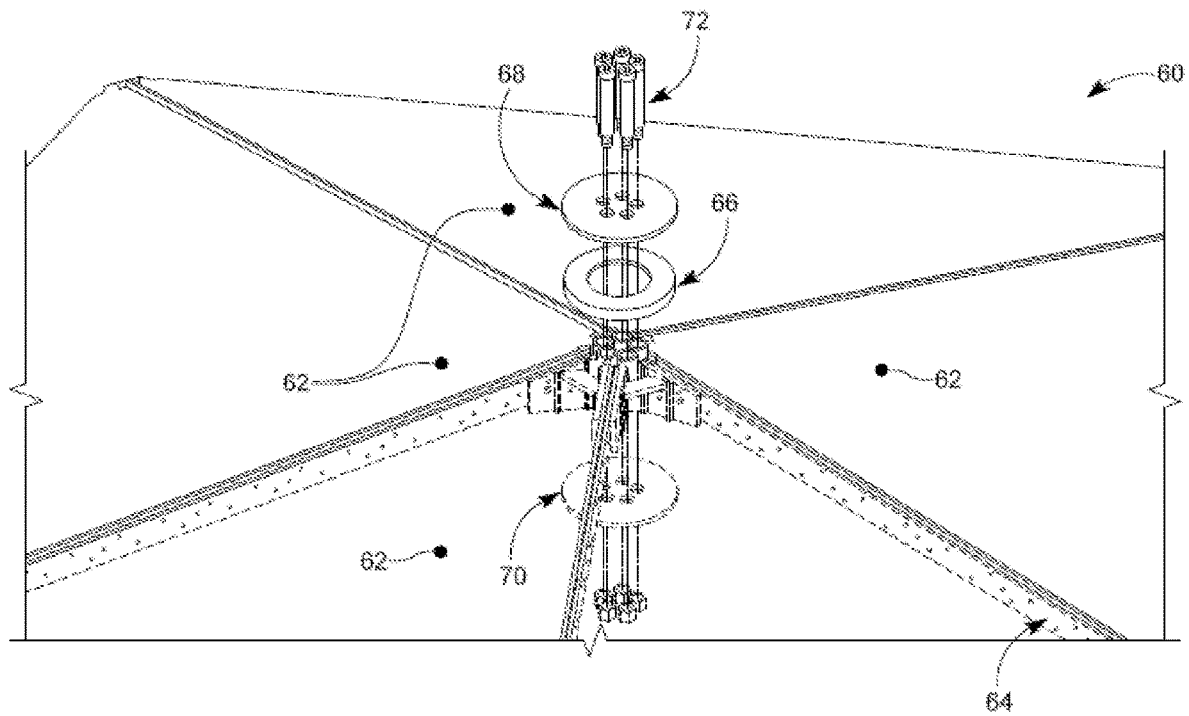
FIG. 6 shows the cluster sealing.
Figure 7:
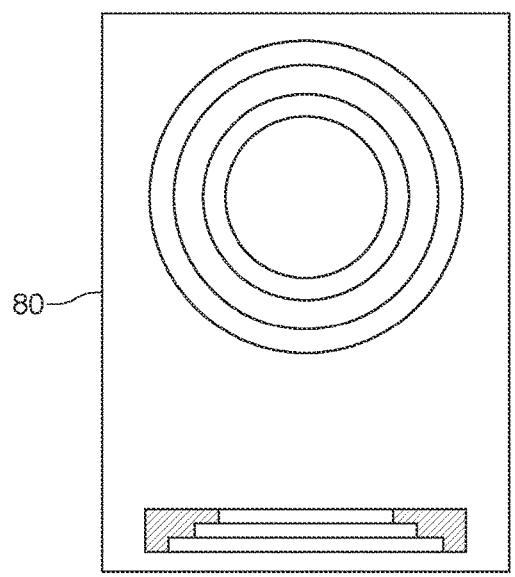
FIG. 7 shows the stepped cluster gasket.

FIG. 6 shows the cluster sealing complex 60 that is comprised of panel membranes 62, joined beams 64, a cluster gasket 66, an outer metal cluster cap cover 68, an inner metal cluster cap cover 70, and shoulder bolts 72. FIG. 7 shows the stepped cluster gasket 80.

Figure 8:
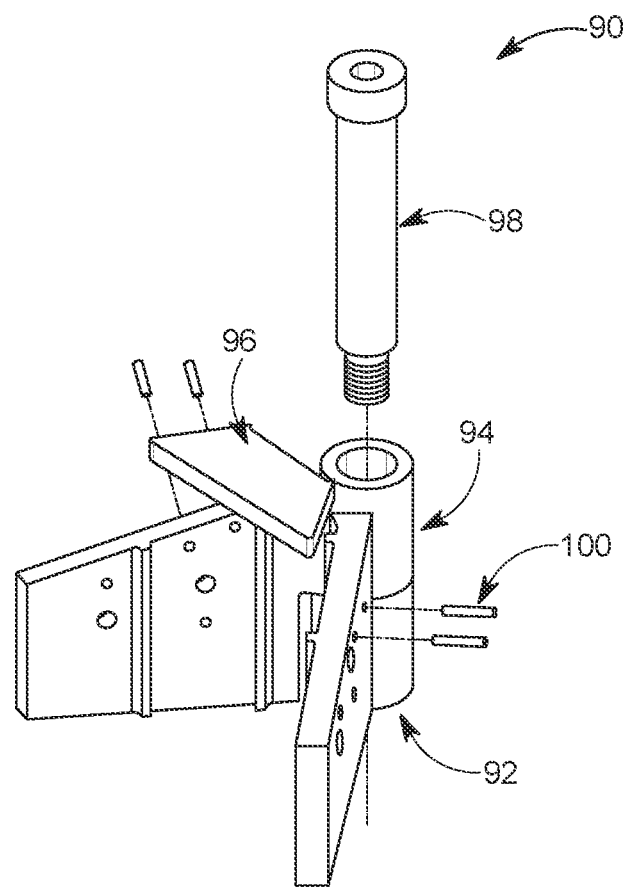
FIG. 8 shows the adjustable panel beam corner joining structure in the unassembled view.
Figure 9:
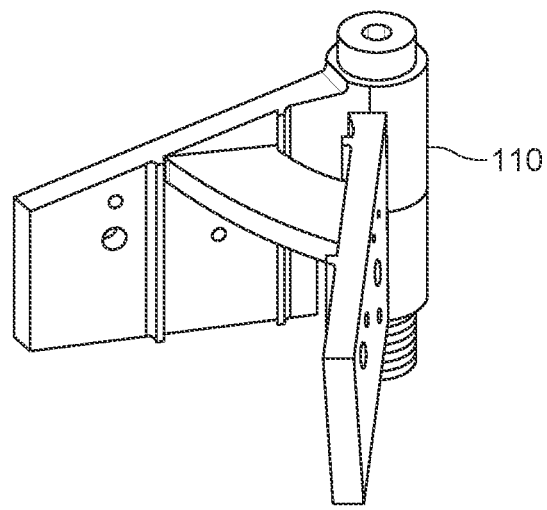
FIG. 9 shows the adjustable panel beam corner joining structure in the assembled view.

FIG. 8 shows an adjustable panel beam corner joining structure 90 unassembled. Structure 90 is comprised of a lower hinge 92, an upper hinge 94, a gusset 96, shoulder bolt 98 and split bushings 100. FIG. 9 shows the adjustable panel beam corner joining structure 110 assembled.

Figure 10:
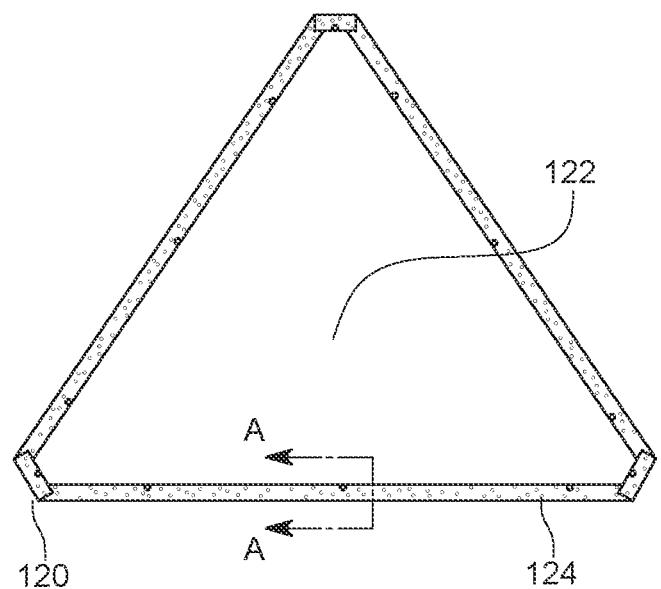
FIG. 10 shows the panel of a radome.
Figure 11:
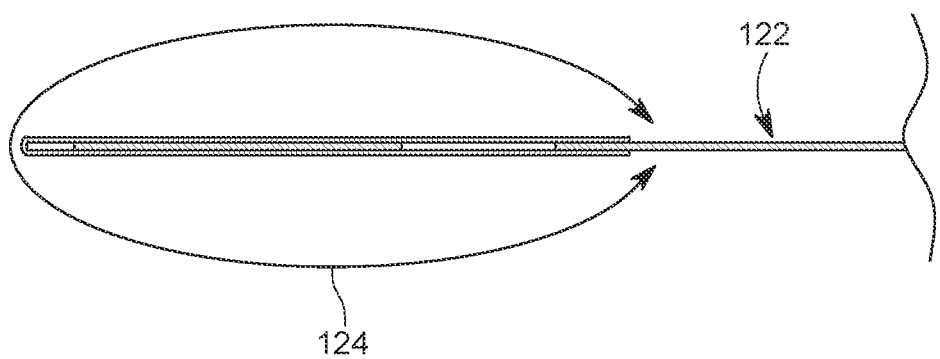
FIG. 11 shows through cross section A-A the film coated panel membrane.

FIG. 10 shows a panel 120 of a radome. The panel 120 comprises a film coated panel membrane 122 and a sealing film channel 124. FIG. 11 shows section A-A of FIG. 10 showing the film coated panel membrane 122 and the seal film channel 124.

The invention claimed is:

1. A radome comprising:
    panels that are mechanically fastened to each other to form a faceted spherical structure; cut edges and holes on every panel membrane sealed from water contact; encapsulating said cut edges and adjacent holes within a sealing-film-channel around said membrane periphery fused to a membrane film-coating on both sides of said membrane.

2. The radome of claim 1 wherein said cut edges of said panel membranes to be sealed use a film wrapped over said membranes edge to form a channel.

3. The radorne of claim 1 wherein said sealing-film-channel and said membrane film-coating are fused when subjected to an optimal temperature, pressure and time cycle.

4. The radome of claim 1 wherein all fastener through-holes cut into said panel membranes are larger than diameter that is necessary to allow each mechanical fastener to pass through said film-coated panel membrane, through-hole diameter oversize amount is dependent on mechanical fastener diameter, temperature, pressure and time fusing cycle.

5. The radome of claim 1 wherein during process of fusing said sealing-film-channel to said membrane film-coating, said sealing-film-channel sides fuse to each other over each through-hole, forming a single film that bridges each oversized through-hole.

6. The radome of claim 5 wherein when piercing said single sealing-film that bridges over through-holes to smaller diameter of said mechanical fastener passing through it, edge of each hole remains sealed.

\* \* \* \* \*